(12) United States Patent
Razeghi-Jahromi et al.

(10) Patent No.: US 12,184,669 B2
(45) Date of Patent: Dec. 31, 2024

(54) SYSTEMS AND METHODS FOR MALICIOUS ATTACK DETECTION IN PHASOR MEASUREMENT UNIT DATA

(71) Applicant: ABB Schweiz AG, Baden (CH)

(72) Inventors: Mohammad Razeghi-Jahromi, Cary, NC (US); David Lee Coats, Apex, NC (US); James D. Stoupis, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 649 days.

(21) Appl. No.: 17/393,767

(22) Filed: Aug. 4, 2021

(65) Prior Publication Data

US 2023/0050490 A1 Feb. 16, 2023

(51) Int. Cl.
*H04L 9/40* (2022.01)
*H02J 13/00* (2006.01)

(52) U.S. Cl.
CPC .... *H04L 63/1416* (2013.01); *H02J 13/00002* (2020.01); *H02J 13/00016* (2020.01); *H02J 13/00032* (2020.01); *H04L 63/1466* (2013.01)

(58) Field of Classification Search
None
See application file for complete search history.

(56) References Cited

U.S. PATENT DOCUMENTS

2011/0288692 A1* 11/2011 Scott ............... H04L 63/20
700/297
2015/0281278 A1* 10/2015 Gooding ........... H04L 63/20
726/1
2016/0253396 A1* 9/2016 Kanabar ........... G06F 16/2228
707/756
2016/0315774 A1* 10/2016 Faruque ........... H04W 12/02
2017/0146585 A1* 5/2017 Wang ............... G01R 23/02
(Continued)

FOREIGN PATENT DOCUMENTS

GB 2558534 A 7/2018

OTHER PUBLICATIONS

Wikipedia, "Phasor measurement unit", Mar. 2010, pp. 1-2 (Year: 2010).*

(Continued)

*Primary Examiner* — David Earl Ogg
(74) *Attorney, Agent, or Firm* — Leydig, Voit & Mayer, Ltd.

(57) ABSTRACT

A method for determining whether a power system is encountering a malicious attack is provided. The method comprises: receiving a plurality of first phasor measurement unit (PMU) measurements from a plurality of PMUs of the power system; determining a plurality of expected PMU measurements associated with a future time period based on an optimization algorithm that uses differences between a plurality of consecutive predictive entries and the plurality of first PMU measurements; receiving, from the plurality of PMUs, a plurality of second PMU measurements associated with the future time period; determining whether the power system is encountering the malicious attack based on comparing the plurality of expected PMU measurements with the plurality of second PMU measurements; and executing an action based on whether the power system is encountering the malicious attack.

18 Claims, 9 Drawing Sheets

(56) References Cited

U.S. PATENT DOCUMENTS

2018/0176249 A1 6/2018 Hong et al.
2018/0262525 A1* 9/2018 Yan .................. G06N 20/00
2020/0356668 A1* 11/2020 Hart ................. G05B 23/0286

OTHER PUBLICATIONS

Chu et al., "Can Predictive Filters Detect Gradually Ramping False Data Injection Attacks Against PMUs", 2019, 2019 IEEE International Conference on Communications, Control, and Computing Technologies for Smart Grids (SmartGridComm), pp. 1-6 (Year: 2019).*
Candès et al., "Exact Matrix Completion via Convex Optimization." *Foundations of Computational Mathematics*, 9(6): 717-772 (May 2008).
Candès et al., "The Power of Convex Relaxation: Near-Optimal Matrix Completion," *IEEE Transactions on Information Theory*, 56(5): 2053-2080 (May 2010).
Dahal et al., "Online Dimension Reduction of Synchrophasor Data," *IEEE*, PES T&D 2012 (May 2012).
Fazel et al., "Hankel Matrix Rank Minimization with Applications to System Identification and Realization," *SIAM Journal on Matrix Analysis and Applications*, 34(3): 946-977 (Jan. 2013).
Fazel, "Matrix Rank Minimization with Applications," Ph.D. Dissertation, Stanford Univ., 130 pp. (Mar. 2002).
Gao et al., "Modeless Reconstruction of Missing Synchrophasor Measurements," *Proc. of IEEE Power & Energy Society General Meeting*, Washington, D.C., 5 pp. (Jul. 2014).
Grant et al., "The CVX Users' Guide Release 2.2," 96 pp. (Jan. 28, 2020).
Jin et al., "Sparse and Low-Rank Decomposition of a Hankel Structured Matrix for Impulse Noise Removal," *IEEE Transactions on Image Processing*, Mar. 2018, pp. 1448-1461, vol. 27, No. 3.
Oymak et al., "Simultaneously Structured Models With Application to Sparse and Low-Rank Matrices," *IEEE Transactions on Information Theory*, 61(5): 2886-2908 (May 2015).

Patel et al., "Real-Time application of Synchrophasors for Improving Reliability to ensure the reliability of the bulk power system," *NERC North American Electric Reliability Corp.*, Princeton, NJ, 77 pp. (Oct. 18, 2010).
Peisert et al., "LBNL Open Power Data," *Berkeley Lab*, 4 pp. (Jan. 18, 2018).
Wang et al., "A Low-Rank Matrix Approach for the Analysis of Large Amounts of Power System Synchrophasor Data," *Proc. of Hawaii International Conf. on System Sciences*, IEEE, 8 pp. (Jan. 2015).
Wang et al., "Recent Results of PMU Data Analytics by Exploiting Low-dimensional Structures," *The 10th Bulk Power Systems Dynamics and Control Symposium—IREP 2017*, Espinho, Portugal, 6 pp. (Aug. 2017).
Wang et al., "A Low-rank Framework of PMU Data Recovery and Event Identification," *2019 International Conference on Smart Grid Synchronized Measurements and Analytics (SGSMA)*, IEEE, 9 pp. (2019).
Zhang et al., "Multichannel Hankel Matrix Completion Through Nonconvex Optimization," *IEEE J. of Selected Topics in Signal Processing*, 12(4):. 617-632 (Aug. 2018).
Zhang et al., "Multi-Channel Missing Data Recovery by Exploiting the Low-rank Hankel Structures," *IEEE International Workshop on Computational Advances in Multi-Sensor Adaptive Processing (CAMSAP)*, Curaçao, Dutch Antilles, 5 pp. (Dec. 2017).
Zhang et al., "Correction of Corrupted Columns Through Fast Robust Hankel Matrix Completion," *IEEE Transactions on Signal Processing*, 67(10): 2580-2594 (May 15, 2019).
Chu et al., "Can Predictive Filters Detect Gradually Ramping False Data Injection Attacks Against PMUs?," *2019 IEEE International Conference on Communications, Control, and Computing Technologies for Smart Grids (SmartGridComm)*, 6 pp. (Oct. 21-23, 2019).
European Patent Office, Extended European Search Report in European Patent Application No. 22188847.2, 7 pp. (Dec. 14, 2022).

* cited by examiner

| 502 | 504 | 506 | 508 | 510 | 512 | 514 | 516 | 518 | 520 |
|---|---|---|---|---|---|---|---|---|---|
| 331.0742 | 18.03707 | 217.4765 | 23.91613 | 83.31959 | 22.5073 | 358.0023 | 7469.843 | 238.2065 | 7471.928 |
| 331.1878 | 18.04292 | 217.6138 | 24.03471 | 83.42173 | 22.51231 | 358.0401 | 7469.822 | 238.245 | 7472.121 |
| 331.8021 | 18.11038 | 217.6602 | 24.06528 | 83.46639 | 22.55771 | 358.0797 | 7469.87 | 238.2845 | 7472.168 |
| 332.2708 | 18.14994 | 217.6804 | 24.04012 | 83.44759 | 22.54937 | 358.12 | 7470.055 | 238.3248 | 7472.142 |
| 332.0626 | 18.06337 | 217.6556 | 23.94303 | 83.41837 | 22.50016 | 358.1612 | 7470.196 | 238.3657 | 7472.101 |
| 331.9281 | 18.04875 | 217.5347 | 23.87921 | 83.52442 | 22.46214 | 358.2051 | 7470.246 | 238.409 | 7472.174 |
| 331.7934 | 18.06468 | 217.4965 | 23.87824 | 83.69821 | 22.38693 | 358.2494 | 7470.307 | 238.454 | 7472.337 |
| 331.5096 | 18.03473 | 217.5076 | 23.88718 | 83.64446 | 22.42081 | 358.292 | 7470.39 | 238.4985 | 7472.333 |
| 331.5121 | 18.05273 | 217.5858 | 23.91053 | 83.58801 | 22.51316 | 358.3354 | 7470.502 | 238.5426 | 7472.347 |
| 331.8519 | 18.08175 | 217.7745 | 23.97633 | 83.74548 | 22.47695 | 358.3802 | 7470.582 | 238.5865 | 7472.511 |

| 502 | 504 | 506 | 508 | 510 | 512 | 514 | 516 | 518 | 520 |
|---|---|---|---|---|---|---|---|---|---|
| 331.5121 | 18.05273 | 217.5858 | 23.91053 | 83.58801 | 22.51316 | 358.3354 | 7470.502 | 238.5426 | 7472.347 |
| 331.8519 | 18.08175 | 217.7745 | 23.97633 | 83.74548 | 22.47695 | 358.3802 | 7470.582 | 238.5865 | 7472.511 |
| X1 | X2 | X3 | X4 | X5 | X6 | X7 | X8 | X9 | X10 |
| X11 | X12 | X13 | X14 | X15 | X16 | X17 | X18 | X19 | X20 |
| X21 | X22 | X23 | X24 | X25 | X26 | X27 | X28 | X29 | X30 |
| X31 | X32 | X33 | X34 | X35 | X36 | X37 | X38 | X39 | X40 |
| X41 | X42 | X43 | X44 | X45 | X46 | X47 | X48 | X49 | X50 |
| X51 | X52 | X53 | X54 | X55 | X56 | X57 | X58 | X59 | X60 |
| X61 | X62 | X63 | X64 | X65 | X66 | X67 | X68 | X69 | X70 |
| X71 | X72 | X73 | X74 | X75 | X76 | X77 | X78 | X79 | X80 |
| X81 | X82 | X83 | X84 | X85 | X86 | X87 | X88 | X89 | X90 |

| | 502 | 504 | 506 | 508 | 510 | 512 | 514 | 516 | 518 | 520 |
|---|---|---|---|---|---|---|---|---|---|---|
| 538 | 331.5121 | 18.05273 | 217.5858 | 23.91053 | 83.58801 | 22.51316 | 358.3354 | 7470.502 | 238.5426 | 7472.347 |
| 540 | 331.8519 | 18.08175 | 217.7745 | 23.97633 | 83.74548 | 22.47695 | 358.3802 | 7470.582 | 238.5865 | 7472.511 |
| 542 | 332.0338 | 18.01117 | 217.7552 | 24.00442 | 83.78693 | 22.46695 | 358.4245 | 7470.635 | 238.6293 | 7472.782 |
| 544 | 331.8992 | 17.8983 | 217.6386 | 23.93157 | 83.48769 | 22.5079 | 358.4662 | 7470.817 | 238.6703 | 7473.005 |
| 546 | 332.0576 | 17.91862 | 217.7263 | 23.88115 | 83.31516 | 22.39565 | 358.5069 | 7470.993 | 238.7114 | 7472.976 |
| 548 | 332.2614 | 17.9743 | 217.8074 | 23.86574 | 83.42555 | 22.26304 | 358.5485 | 7470.826 | 238.7541 | 7472.908 |
| 550 | 332.1275 | 17.92726 | 217.6449 | 23.73643 | 83.57313 | 22.21921 | 358.5886 | 7470.55 | 238.7941 | 7472.965 |
| 552 | 331.9886 | 17.9606 | 217.555 | 23.61582 | 83.80306 | 22.27532 | 358.6254 | 7470.417 | 238.8302 | 7472.917 |
| 554 | 332.0151 | 18.10714 | 217.8105 | 23.64067 | 84.04653 | 22.38574 | 358.6597 | 7470.207 | 238.8675 | 7472.715 |
| 556 | 331.9855 | 18.08795 | 217.946 | 23.65866 | 84.24898 | 22.38089 | 358.6953 | 7470.003 | 238.9056 | 7472.5 |
| 558 | 331.875 | 17.9635 | 217.8432 | 23.67761 | 84.44734 | 22.39613 | 358.7318 | 7469.863 | 238.9409 | 7472.299 |

SYSTEMS AND METHODS FOR MALICIOUS ATTACK DETECTION IN PHASOR MEASUREMENT UNIT DATA

FEDERAL FUNDING

This invention was made with government support under Contract No. DE-AR0001024 awarded by the Department of Energy and the Advanced Research Projects Agency—Energy. The federal government may have certain rights in this invention.

FIELD

The present disclosure relates to false data injection and anomaly detection in phasor measurement unit (PMU) data.

BACKGROUND

A smart grid improves the efficiency of power grids via the aid of communication, signal processing, and control technologies. While smart grid integration enables power grid networks to be smarter, it also increases the risk of cyberattacks due to the strong dependence on the cyberinfrastructure in the overall system. Unfortunately, cyberattacks have only been increasing as of late and have been targeting many industries including in the power industry. For instance, a malicious entity may attempt to perform an attack (e.g., false data injections) on an electric power grid or power system, which may cause significant harm to the industry and to the end consumers.

State estimation is a critical component of power system monitoring. System state is estimated based on the obtained measurements across the power system. Bad data can affect the state estimation and mislead the system operator. Conventional bad data detection techniques are typically based on gross errors appearing in the measurement residuals that can be detected using statistical analysis such as Chi square test. While relatively effective against random noises, these detectors/detection methods lack the ability to detect highly structured bad data that conforms to the network topology and some particular physical laws. Therefore, unsavory entities may perform malicious attacks such as false data injection (FDI) attacks that can be unobservable to the residual based bad data detection (BDD).

In some instances, Nuclear Norm Minimization may be used to detect FDI attacks. However, while Nuclear Norm may be able to determine randomized missing data, Nuclear Norm is not able to determine temporally missing data by itself. Randomized missing data may include data losses that occur randomly and independently across time and channels. Temporally missing data may include data that is lost at randomly selected time instants and the data points in all channels may be lost simultaneously. In other words, while Nuclear Norm may be used to detect whether a single PMU measurement from a PMU is subject to a FDI attack, it is unable to determine whether a string of consecutive PMU measurements from a PMU are subject to a FDI attack. Accordingly, there remains a technical need for stronger cybersecurity to prevent these malicious attacks including false data injections.

SUMMARY

A first aspect of the present disclosure provides a method for determining whether a power system is encountering a malicious attack. The method comprises: receiving a plurality of first phasor measurement unit (PMU) measurements from a plurality of PMUs of the power system, wherein each of the plurality of first PMU measurements is associated with a time stamp and a sensor reading corresponding to an electrical characteristic; determining a plurality of expected PMU measurements associated with a future time period based on an optimization algorithm that uses differences between a plurality of consecutive predictive entries and the plurality of first PMU measurements, wherein a first predictive entry, of the plurality of consecutive predictive entries, is immediately subsequent to the plurality of first PMU measurements; receiving, from the plurality of PMUs, a plurality of second PMU measurements associated with the future time period; determining whether the power system is encountering the malicious attack based on comparing the plurality of expected PMU measurements with the plurality of second PMU measurements; and executing an action based on whether the power system is encountering the malicious attack.

According to an implementation of the first aspect, each of the plurality of PMUs is located at a different location within a power system and configured to obtain a plurality of sensor readings corresponding to a plurality of electrical characteristics at the location, and the plurality of electrical characteristics comprise a magnitude of a current, a phase angle of the current, a magnitude of a voltage, and a phase angle of the voltage.

According to an implementation of the first aspect, determining the plurality of expected PMU measurements associated with the future time period comprises: assigning a plurality of variables for a plurality of entries associated with the future time period, wherein the plurality of variables are the plurality of consecutive predictive entries; determining a total variation (TV) norm definition based on the plurality of variables and the plurality of first PMU measurements; and inputting the equation into the optimization algorithm to determine the plurality of expected PMU measurements.

According to an implementation of the first aspect, determining the TV norm definition is based on using a column stacking vector and a TV algorithm.

According to an implementation of the first aspect, the TV algorithm is a first order equation that is a summation of: differences between consecutive variables within the plurality of variables; differences between consecutive values within the plurality of first PMU measurements; and differences between a variable, from the plurality of variables, and a PMU measurement, from the plurality of first PMU measurements, that are sequential in time.

According to an implementation of the first aspect, the TV algorithm is a second order equation.

According to an implementation of the first aspect, determining the TV norm definition is further based on using a nuclear norm minimization algorithm and a TV parameter that is a weighted value for the TV algorithm to distinguish the TV algorithm from the nuclear norm minimization algorithm.

According to an implementation of the first aspect, the method further comprises: using a plurality of historical PMU measurements from the plurality of PMUs within the power system to determine a plurality of TV parameters; and determining the TV parameter from the plurality of TV parameters based on a relative recovery error associated with the plurality of historical PMU measurements.

According to an implementation of the first aspect, the method further comprises: determining that the plurality of first PMU measurements comprises one or more missing entries; and determining one or more substitute entries for the one or more missing entries based on using a total variation (TV) norm definition, wherein determining the plurality of expected PMU measurements is further based on using the one or more substitute entries.

A second aspect of the present disclosure provides a power system comprising a plurality of PMUs configured to obtain a plurality of first phasor measurement unit (PMU) measurements and a hierarchical computing system. The hierarchical computing system comprises: one or more first computing systems configured to: receive the plurality of first PMU measurements from the plurality of PMUs, wherein each of the plurality of first PMU measurements is associated with a time stamp and a sensor reading corresponding to an electrical characteristic; and provide the plurality of first PMU measurements to one or more second computing systems; and the one or more second computing systems configured to: determine a plurality of expected PMU measurements associated with a future time period based on an optimization algorithm that uses differences between a plurality of consecutive predictive entries and the plurality of first PMU measurements, wherein a first predictive entry, of the plurality of consecutive predictive entries, is immediately subsequent to the plurality of first PMU measurements; receive, from the plurality of PMUs, a plurality of second PMU measurements associated with the future time period; determine whether the power system is encountering a malicious attack based on comparing the plurality of expected PMU measurements with the plurality of second PMU measurements; and execute an action based on whether the power system is encountering the malicious attack.

According to an implementation of the second aspect, each of the plurality of PMUs is located at a different location within a power system and configured to obtain a plurality of sensor readings corresponding to a plurality of electrical characteristics at the location, and the plurality of electrical characteristics comprise a magnitude of a current, a phase angle of the current, a magnitude of a voltage, and a phase angle of the voltage.

According to an implementation of the second aspect, determining the plurality of expected PMU measurements associated with the future time period comprises: assigning a plurality of variables for a plurality of entries associated with the future time period, wherein the plurality of variables are the plurality of consecutive predictive entries; determining a total variation (TV) norm definition based on the plurality of variables and the plurality of first PMU measurements; and inputting the equation into the optimization algorithm to determine the plurality of expected PMU measurements.

According to an implementation of the second aspect, determining the TV norm definition is based on using a column stacking vector and a TV algorithm.

According to an implementation of the second aspect, the TV algorithm is a first order equation that is a summation of: differences between consecutive variables within the plurality of variables; differences between consecutive values within the plurality of first PMU measurements; and differences between a variable, from the plurality of variables, and a PMU measurement, from the plurality of first PMU measurements, that are sequential in time.

According to an implementation of the second aspect, the TV algorithm is a second order equation.

According to an implementation of the second aspect, determining the TV norm definition is further based on using a nuclear norm minimization algorithm and a TV parameter that is a weighted value for the TV algorithm to distinguish the TV algorithm from the nuclear norm minimization algorithm.

According to an implementation of the second aspect, the one or more second computing systems are further configured to: use a plurality of historical PMU measurements from the plurality of PMUs within the power system to determine a plurality of TV parameters; and determine the TV parameter from the plurality of TV parameters based on a relative recovery error associated with the plurality of historical PMU measurements.

According to an implementation of the second aspect, the one or more second computing systems are further configured to: determine that the plurality of first PMU measurements comprises one or more missing entries; determine one or more substitute entries for the one or more missing entries based on using a total variation (TV) norm definition, wherein determining the plurality of expected PMU measurements is further based on using the one or more substitute entries.

A third aspect of the present disclosure provides a non-transitory computer-readable medium having processor-executable instructions stored thereon. The processor-executable instructions, when executed by one or more controllers, facilitate: receiving a plurality of first phasor measurement unit (PMU) measurements from a plurality of PMUs of the power system, wherein each of the plurality of first PMU measurements is associated with a time stamp and a sensor reading corresponding to an electrical characteristic; determining a plurality of expected PMU measurements associated with a future time period based on an optimization algorithm that uses differences between a plurality of consecutive predictive entries and the plurality of first PMU measurements, wherein a first predictive entry, of the plurality of consecutive predictive entries, is immediately subsequent to the plurality of first PMU measurements; receiving, from the plurality of PMUs, a plurality of second PMU measurements associated with the future time period; determining whether the power system is encountering a malicious attack based on comparing the plurality of expected PMU measurements with the plurality of second PMU measurements; and executing an action based on whether the power system is encountering the malicious attack.

According to an implementation of the third aspect, wherein each of the plurality of PMUs is located at a different location within a power system and configured to obtain a plurality of sensor readings corresponding to a plurality of electrical characteristics at the location, and wherein the plurality of electrical characteristics comprise a magnitude of a current, a phase angle of the current, a magnitude of a voltage, and a phase angle of the voltage.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following:

FIG. 5 depicts an exemplary PMU dataset of sensor measurements according to one or more examples the present disclosure;

FIGS. 6A and 6B depict an exemplary PMU dataset with predictive entries according to one or more examples of the present disclosure;

FIG. 7 depicts another exemplary PMU dataset of sensor measurements with obtained PMU measurements according to one or more examples of the present disclosure.

DETAILED DESCRIPTION

Figure 1:
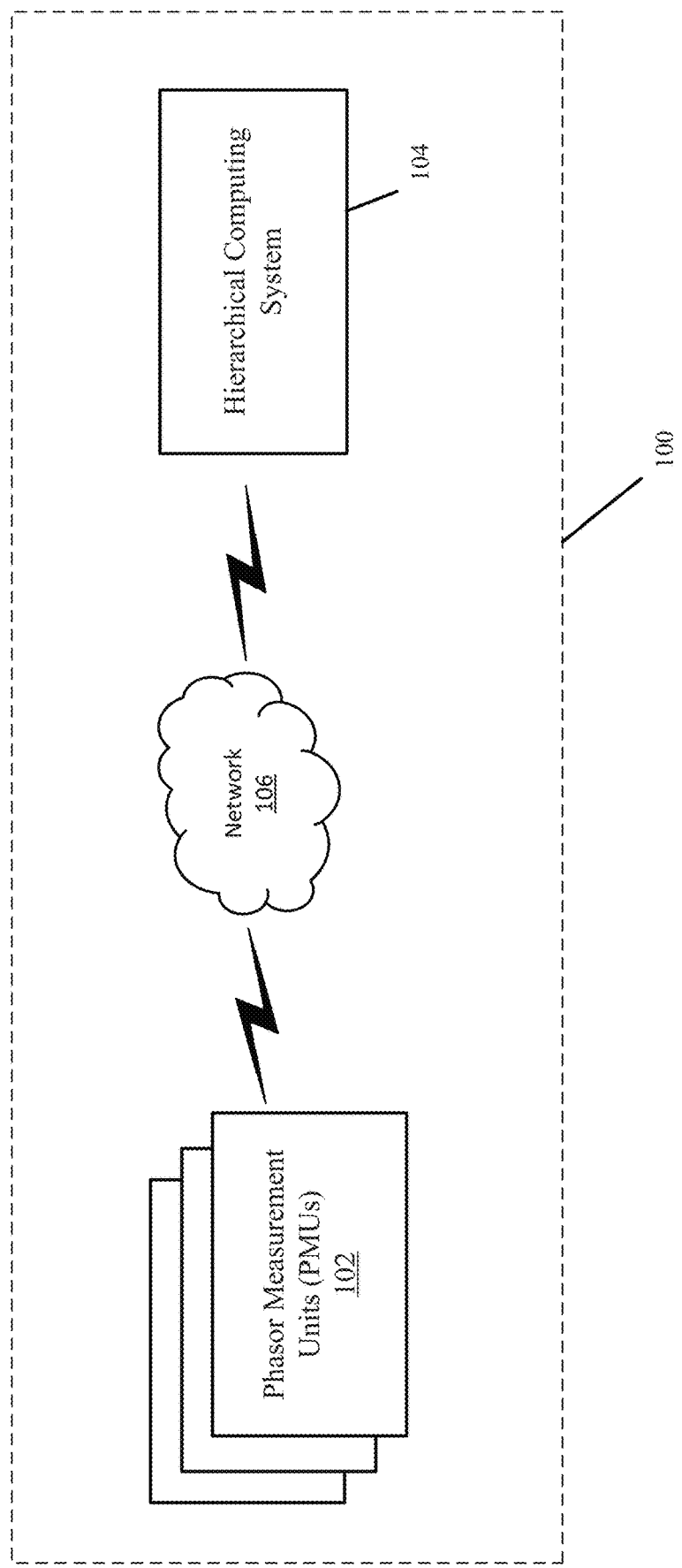
FIG. 1 illustrates a simplified block diagram depicting an exemplary environment for detecting malicious attacks according to one or more examples of the present disclosure.

The present disclosure describes a system and method for detecting malicious attacks. For example, a plurality of phasor measurement units (PMUs) may be spread across a power system (e.g., an electrical/power grid) and may provide sensor measurements (e.g., voltage, current, frequency, and so on) to a computing system at a periodic time interval. Given the high sampling rate of PMUs, the PMU measurements may be highly correlated in time because the power system is unlikely to have dramatic changes in such a short time period under normal operating conditions. Therefore, a computing system that takes into consideration the temporal correlations of the PMU measurements may be able to detect such "unobservable" FDI attacks. For instance, the system may use a predictive filter to accurately predict the PMU measurements. This filter flags one or more anomalies based on the difference between measured value and predicted value being larger than a threshold, which is often the case when an FDI attack is launched.

To put it another way, state estimation in an electric power grid (e.g., power system) may be vulnerable to false data injection attacks and diagnosing these kinds of malicious attacks as well as other malicious attacks may have significant impacts on ensuring reliable operations for power systems. As will be described below, the false data injection and anomaly detection problem may be viewed as a data-driven sparse optimization technique to compare the error between predicted values and real measurements with a predefined threshold. By noticing the intrinsic low dimensionality and slowly varying of temporal measurements of power grid states, the present disclosure provides an anomaly and false data detection mechanism. In some instances, the method and system described herein for detecting malicious attacks might not require knowing a-priori information about the Jacobian matrix (system structure or topological information) and/or any assumption that the background noise in state estimation is white Gaussian noise (WGN). Further, the method and system described herein may predict proper power system operation states as well as detect the malicious attacks.

Exemplary aspects according to the present disclosure, are further elucidated below in connection with exemplary embodiments, as depicted in the figures. The exemplary embodiments illustrate some implementations of the present disclosure and are not intended to limit the scope of the present disclosure. Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

FIG. 1 illustrates a simplified block diagram depicting an exemplary environment for detecting malicious attacks according to one or more examples of the present disclosure. Referring to FIG. 1, the environment 100 may be a power system and may include one or more PMUs 102, a hierarchical computing system 104 (e.g., an edge computing device), and a network 106. Although the entities within environment 100 may be described below and/or depicted in the FIGS. as being singular entities, it will be appreciated that the entities and functionalities discussed herein may be implemented by and/or include one or more entities.

The entities within the environment 100 such as the PMUs 102 and the hierarchical computing system 104 may be in communication with other systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100. For example, the PMUs 102 may be connected to the hierarchical computing system 104 via a wired connection such that the PMUs 102 may provide sensor measurements to the hierarchical computing system 104. Additionally, and/or alternatively, the PMUs 102 may include a network communications interface that is capable of transmitting information to the hierarchical computing system 104 using wireless communications (e.g., via one or more communication protocols such as WI-FI, BLUETOOTH, and so on).

The hierarchical computing system 104 is a computing system that includes one or more computing devices, computing platforms, systems, servers, and/or other apparatuses capable of performing tasks, functions, and/or other actions for the environment 100. In particular, the back-end computing system 104 may communicate with the PMUs 102 and/or additional computing devices. For example, the back-end computing system 104 may receive sensor measurements from the PMUs 102, determine missing and substitute entries for use in a variety of applications such as state estimation of the power system, and/or detect malicious attacks such as FDIs. For example, the hierarchical computing system 104 may obtain first PMU measurements from a plurality of PMUs 102, generate a PMU dataset (e.g., one or more matrices that include the PMU measurements), determine predictive entries for a future time period, obtain second PMU measurements from the PMUs 102, and determine whether the power system is encountering a malicious attack based on comparing the predictive entries with the second PMU measurements. This will be described in further detail below.

The PMUs 102 are devices that are used to obtain, measure, determine, and/or provide measurements associated with a power system and/or an electric grid. For example, the PMUs 102 may measure electrical characteristics (e.g., voltage, current, power) including the magnitude and phase angles of an electrical phasor quantity within the power system/electric grid. The electrical characteristics that may be obtained by the PMUs 102 include, but are not limited to, one or more sequence current magnitudes, one or more sequence current phase angles, one or more phase current magnitudes, one or more phase current angles, one or more sequence voltage magnitudes, one or more sequence voltage phase angles, one or more phase voltage magnitudes, one or more phase voltage phase angles, one or more ground current magnitudes, one or more current phase angles, one or more frequencies, and/or one or more frequency deltas.

The PMUs 102 may provide information indicating the electrical characteristics to the hierarchical computing system 104. This may be done at certain time intervals (e.g., certain sampling rates such as 30, 50, or 60 samples per second). For instance, in a simplified example, each PMU 102 may measure the electrical characteristics every second and then provide these electrical characteristics to the hierarchical computing system 104. The hierarchical computing system 104 may receive these measurements from all of the PMUs 102. The size of this data may be massive. For example, this may be in the range of several terabits per day; however, a current system may handle 120 online PMUs with 3.6 billion measurements archived per day with only a storage size of 36 gigabits (GB). Accordingly, due to the storage space as well as the amount of collected data per day, there needs to be an efficient system to determine the missing PMU measurements in a timely manner as well as detect whether the power system is encountering a malicious attack.

In some variations, the hierarchical computing system 104 may be implemented using one or more computing platforms, devices, servers, and/or apparatuses. In other variations, the hierarchical computing system 104 may be implemented as engines, software functions, and/or applications. In other words, the functionalities of the hierarchical computing system 104 may be implemented as software instructions stored in storage (e.g., memory) and executed by one or more processors.

It will be appreciated that the exemplary environment depicted in FIG. 1 is merely an example, and that the principles discussed herein may also be applicable to other environments.

Figure 2:
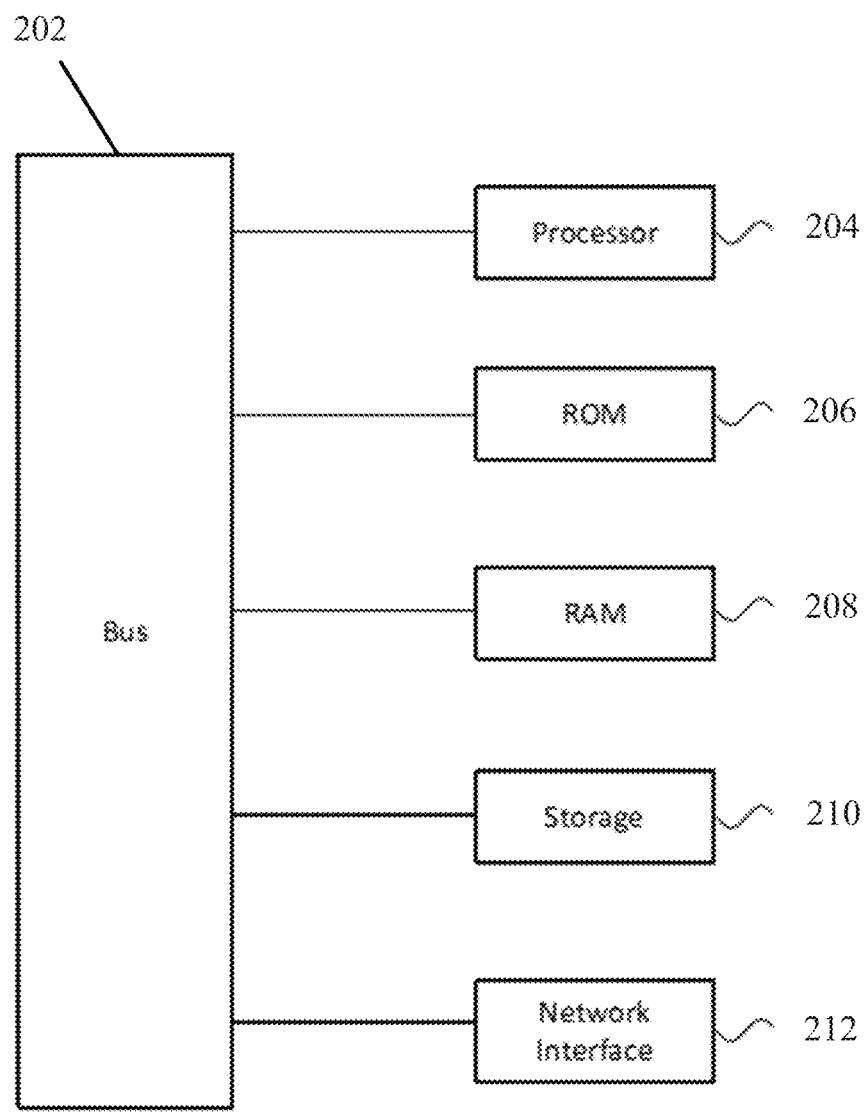
FIG. 2 illustrates a simplified block diagram of one or more devices or systems within the exemplary environment of FIG. 1.

FIG. 2 is a block diagram of an exemplary system and/or device 200 (e.g., the hierarchical computing system 104) within the environment 100. The device/system 200 includes a processor 204, such as a central processing unit (CPU), controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200.

Figure 3:
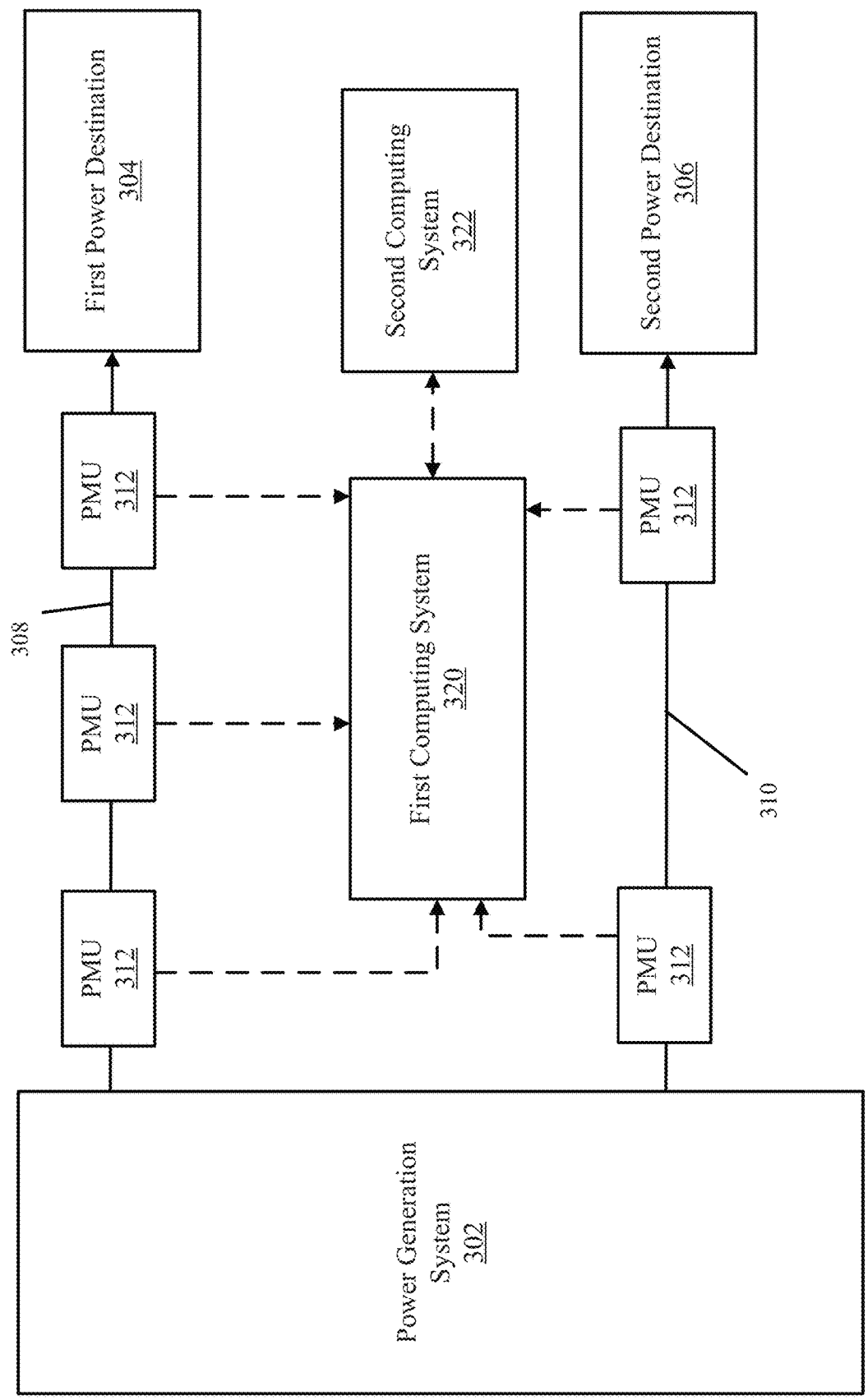
FIG. 3 illustrates a simplified block diagram depicting another exemplary environment for detecting malicious attacks according to one or more examples of the present disclosure.

FIG. 3 illustrates a simplified block diagram depicting another exemplary environment for detecting malicious attacks according to one or more examples of the present disclosure. The environment 300 may be an exemplary power grid and/or power system. The environment 300 may similar to environment 100, but also shows a power generation system 302 as well as a first and second power destination 304 and 306. The hierarchical computing system 104 of environment 100 may include the first computing system 320 and the second computing system 322. For instance, the first computing system 320 may obtain the PMU measurements from the PMUs 312 and provide the PMU measurements to the second computing system 322. The environment 300 may further include PMUs 312 that are in electrical communication (e.g., denoted by the dotted lines) with the hierarchical computing system 104.

Further, the environment 300 also includes a power generation system 302. The power generation system 302 is any system that is capable of generating power. For example, the power generation system 302 may be a power plant or another power provider. The power generation system 302 may provide the generated power to a plurality of destinations such as a first power destination 304 and a second power destination 306. For example, the first and second power destinations 304 and 306 may be regional distribution centers for providing the generated power or direct consumers such as factories or manufacturing plants. The lines 308 and 310 may be power lines that are used to provide the generated power from the power generation system 302 to the first and second power destinations 304 and 306. The PMUs 312 may be spread across these power lines 308 and 310 and may measure sensor measurements (e.g., magnitude/phase angle of the voltage/current) at the locations on the power lines 308 and 310.

The hierarchical computing system 104 may include the first computing system 320 and the second computing system 322. The first computing system 320 may be and/or include an edge computing device (e.g., a compact and/or low-power ruggedized computing device often collocated with distribution hardware such as re-closers or line sensors), a rugged computing device embedded within power components/collocated within their control cabinets or shelfs, and/or a substation computer/server. The second computing system 322 may be and/or include a substation computer/server, or servers at the utility control center or in a public, another edge computing device, or on-premise cloud.

For example, in operation, the first computing system 320 may be a computing element located within a distribution control cabinet communicating wired or wirelessly to collocated digital sample gathering units and/or PMU devices. The first computing system 320 may provide initial preprocessing, data formatting, or operation of the data recovery algorithms. Updates from the processing performed on the first computing system 320 may be communicated to a substation computer/server acting as the second computing system 322 over either via a wired or wireless protocol. This computer/server system 322 may perform aggregation of one or more first computing system(s) 320 and the data recovery algorithm on the digital sampled data. In some instances, the second computing system 322 may be implemented as a container or virtual machine running on physical computer, server, or cloud bare metal hardware.

It will be appreciated that the exemplary environment depicted in FIG. 3 is merely an example, and that the principles discussed herein may also be applicable to other environments. In particular, power systems and power grids may include significantly more power generation systems, power lines, destinations, and/or PMUs. Accordingly, numerous PMUs (e.g., hundreds, thousands, or even greater in number PMUs) may be in communication with the hierarchical computing system 104 and provide the measured sensor measurements to the hierarchical computing system 104. Further, in some variations, the hierarchical computing system 104 may include numerous (e.g., three or more) computing systems and each computing system may pass information up the chain to the next computing system. For instance, the first computing system 320 may receive the PMU measurements from the PMUs 312 and may provide the PMU measurements to the second computing system 322. Then, the second computing system 322 may perform one or more functionalities and/or provide the PMU measurements and/or other data to a third computing system. The third computing system may perform one or more functionalities and/or provide the PMU measurements and/or other data to a fourth computing system, and so on. Any one of the computing systems (e.g., the first computing system, the second computing system, the third computing system, the fourth computing system, and so on) may perform process 400, which is described below, to detect the malicious attacks.

Figure 4:
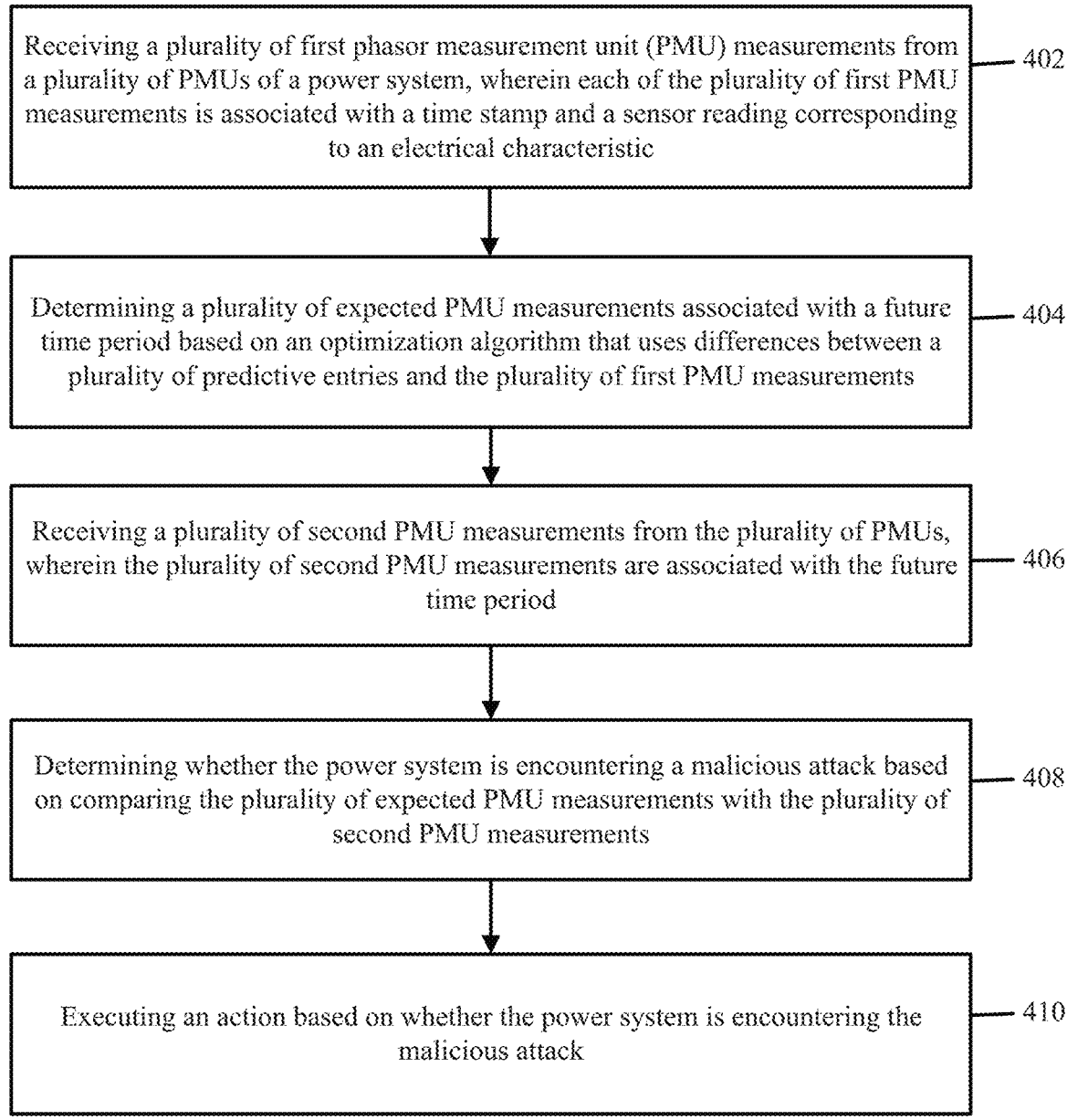
FIG. 4 illustrates a process for detecting malicious attacks according to one or more examples of the present disclosure.

FIG. 4 illustrates a process for detecting malicious attacks according to one or more examples of the present disclosure. The process 400 may be performed by the hierarchical computing system 104 that is shown in FIGS. 1 and 3. However, it will be recognized that any of the following blocks may be performed in any suitable order and that the process 400 may be performed in any suitable environment and by any suitable device and/or system.

At block 402, the hierarchical computing system 104 receives a plurality of first phasor measurement unit (PMU) measurements from a plurality of PMUs (e.g., PMUs 102 and/or 312) of a power system (e.g., a power grid). Each of the plurality of first PMU measurements is associated with a time stamp and a sensor reading corresponding to an electrical characteristic. For example, the PMUs may be spread across a power system/power grid and may obtain measurements (e.g., electrical characteristic measurements such as magnitude and phase angles of the current and voltage) at their location. The PMUs may obtain these measurements at a certain sampling rate and/or a periodic time interval (e.g., every second or thirty times per second). After obtaining these measurements, the PMUs may provide and the hierarchical computing system 104 may receive these measurements. For each of these measurements that are received by the hierarchical computing system 104, the measurements may include a time stamp such as a certain time of the day (e.g., 10:00 AM) that the measurement was taken by the PMU as well as a sensor reading such as a magnitude or phase angle of the current (e.g., 1 Amp (A)) and/or voltage (e.g., 5 Volts (V)). Each PMU may obtain a plurality of sensors measurements at the time stamp and provide these measurements as well as the time stamp to the hierarchical computing system 104.

In some variations, the hierarchical computing system 104 may populate a PMU dataset based on the plurality of first PMU measurements. For example, the PMU dataset may be and/or include one or more matrices and the hierarchical computing system 104 may populate the PMU dataset using the received PMU measurements. For instance, the PMU dataset may include a plurality of entries (e.g., denoting the entries/values within the matrix) and each of the entries is associated with a PMU measurement. FIG. 5 shows an exemplary PMU dataset and will be used to describe block 404 and process 400 in more detail.

In particular, FIG. 5 depicts an exemplary PMU dataset 500 of PMU sensor measurements according to one or more examples the present disclosure. The PMU dataset 500 may include multiple PMU measurements from multiple different PMUs (e.g., PMUs 102 and/or 312). For instance, each PMU may provide one or more PMU measurements. In some instances, a first PMU may provide the PMU measurements shown in columns 502-512, a second PMU may provide the PMU measurements shown in columns 514 and 516, and a third PMU may provide the PMU measurements shown in columns 518-520. In other words, the first PMU may provide a first current angle (e.g., column 502), a first current magnitude (e.g., column 504) associated with the first current angle, a second current angle (e.g., column 506), a second current magnitude (e.g., column 508) associated with the second current angle, a third current angle (e.g., column 510), and a third current magnitude (e.g., column 512) associated with the third current angle. The second PMU may provide a first voltage angle (e.g., column 514) and a first voltage magnitude (e.g., column 516) associated with the first voltage angle. The third PMU may provide a second voltage angle (e.g., column 518) and a second voltage magnitude (e.g., column 520) associated with second voltage angle. The rows 522-540 correspond to a sampling rate for the PMU measurements and denote a particular time associated with the PMU measurement. For instance, row 522 may indicate a first time (e.g., 10:00:00 AM) that the PMUs made these particular measurements, row 524 may indicate a second time that is a second later (e.g., 10:00:01 AM) that the PMUs made these particular measurements, and so on. For example, the first PMU may have provided two PMU measurements (e.g., 331.0742 and 18.03707) to the hierarchical computing system 104 with the 10:00:00 AM time stamp.

The PMUs may continuously obtain and provide PMU measurements along with their time stamps to the hierarchical computing system 104. After receiving these PMU measurements, the hierarchical computing system 104 may continuously update and/or populate the PMU dataset (e.g., the PMU dataset 500) with this data. It will be appreciated that the exemplary PMU dataset 500 depicted in FIG. 5 is merely an example, and that the hierarchical computing system 104 may continuously obtain PMU measurements from numerous PMUs (e.g., hundreds, thousands, and so on). As such, the PMU dataset may include substantially more entries within the matrix (e.g., tens, hundreds, thousands of columns, or even greater number of columns) representing the PMU measurements taken from the PMUs. Further, the sampling rate for the PMUs may be 1 sample a minute, 1 sample per second, 30 samples per second, 60 samples per second, or a different sampling rate. Therefore, the number of rows within the PMU dataset may greater (even substantially greater) than as shown in the PMU dataset 500.

The hierarchical computing system 104 may perform one or more functionalities using the plurality of first PMU measurements and/or the PMU dataset. For instance, the hierarchical computing system 104 may use the PMU dataset for state estimation (e.g., identify the present operating state of a particular power system and/or power grid such as the power system 300). Additionally, and/or alternatively, the hierarchical computing system 104 may use the PMU dataset for anomaly detection and/or detection of malicious attacks. For example, based on the expectation that the PMU dataset might not change drastically in continuous time intervals, the hierarchical computing system 104 may determine (e.g., predict and/or estimate) a plurality of predictive (e.g., expected) entries for a future time period (e.g., 30 seconds into the future). Then, the hierarchical computing system 104 may compare the predictive entries with the actual obtained entries for the future time period (e.g., the 30 seconds into the future) and determine whether there is a malicious attack based on the comparison. This will be described in further detail in blocks 404-408 below.

Figure 6A:
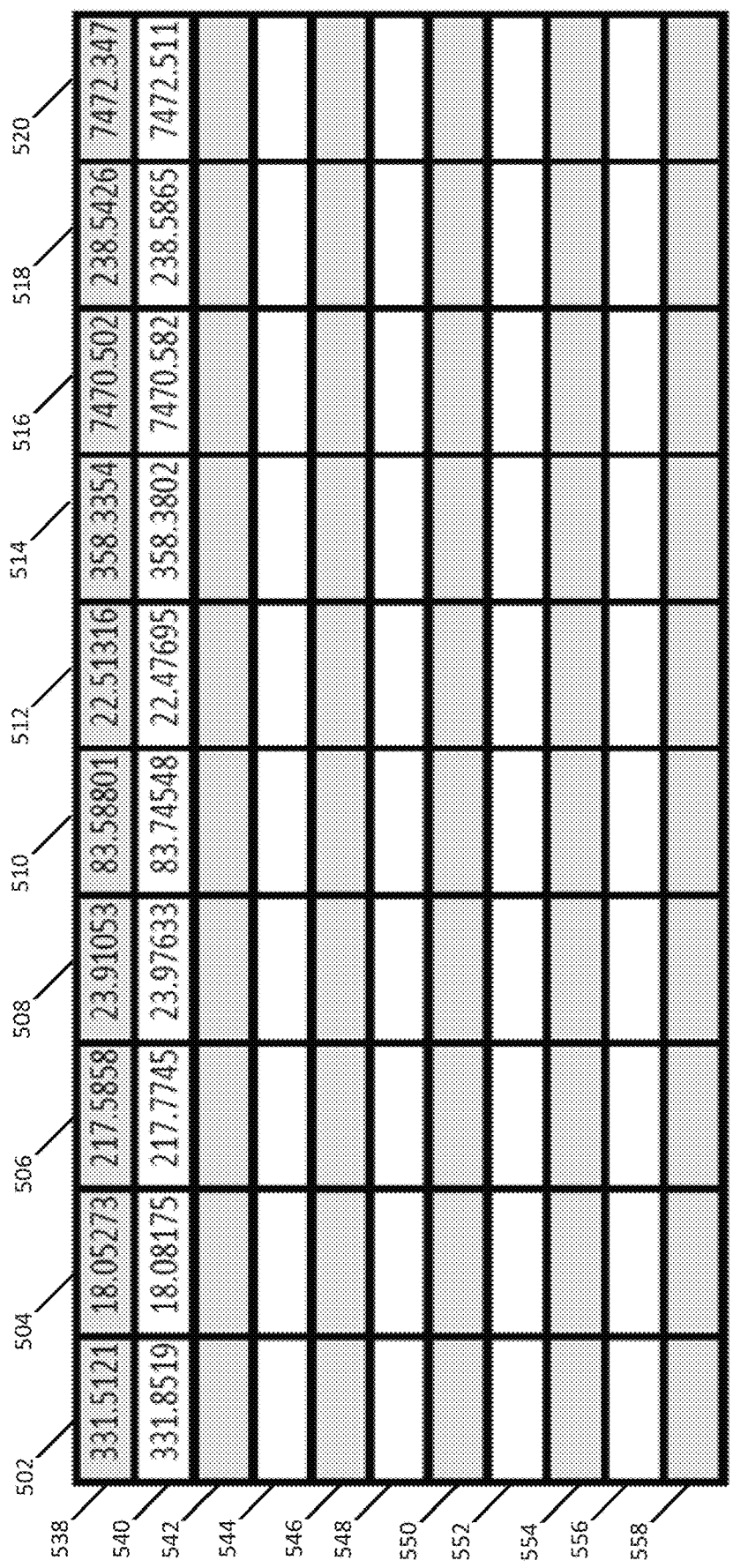

Referring back to FIG. 4, at block 404, the hierarchical computing system 104 determines a plurality of expected PMU measurements associated with a future time period based on an optimization algorithm that uses differences between a plurality of predictive entries and the plurality of first PMU measurements. For example, referring back FIG. 5, the PMU dataset 500 includes a plurality of first PMU measurements for an initial time period (e.g., the time period associated with the rows 522-540). At block 404, the hierarchical computing system 104 determines or calculates expected PMU values for a future time period (e.g., a subsequent time period) using an optimization algorithm. The future time period may be any time period that is after the time period for the first PMU measurements. As such, they may be immediately subsequent to the time period for the first PMU measurements, which is shown in FIGS. 6A and 6B, or they may be even further in the future (e.g., 30 seconds in the future). In other words, unlike the first PMU measurements, the expected PMU measurements are PMU measurements that are not obtained or received from actual PMUs (e.g., the PMUs 102), but rather calculated, estimated, or expected values of the PMU measurements at this future time period. FIGS. 6A and 6B will be used to describe the calculation of the PMU values.

FIGS. 6A and 6B depict an exemplary PMU dataset with predictive (e.g., expected) entries according to one or more examples of the present disclosure. In particular, FIG. 6A shows a dataset 600 that includes a subset or portion of the plurality of first PMU measurements (e.g., the PMU measurements associated with rows 538 and 540). Further, the PMU dataset 600 shows a plurality of empty entries associated with rows 542-558. For instance, the rows 538 and 540 may indicate particular times such as 10:00:01 AM and 10:00:02 AM. The rows 542-558 may indicate a future time period such as from 10:00:03 AM to 10:00:11 AM and the entries associated with these rows may initially be blank as the hierarchical computing system 104 has not received these PMU measurements from the PMU sensors yet. Accordingly, the hierarchical computing system 104 may assign variables to these blank entries. The predictive entries may be the variables associated with these blank entries. FIG. 6B shows the dataset 600 with the empty rows 542-558 filled with variables X1 to X90. As such, the predictive entries may be the variables X1 to X90. The hierarchical computing system 104 may calculate PMU values (e.g., expected PMU measurements) for the variables X1 to X90 using the optimization/minimization algorithm.

To put it another way, the hierarchical computing system 104 may receive/obtain a plurality of first PMU measurements (e.g., the PMU measurements shown in FIG. 5 and dataset 500). Then, for a future time period (e.g., a subsequent time period), the hierarchical computing system 104 may also calculate a plurality of PMU measurements using an optimization/minimization algorithm, at least a portion of the first PMU measurements, and the predictive entries (e.g., the variables X1 to X90).

To determine the expected PMU measurements, the hierarchical computing system 104 may use an optimization algorithm that takes into account the differences associated with the plurality of predictive entries (e.g., differences between the variables X1 to X90) and the plurality of first PMU measurements. For example, as mentioned previously, each column may be associated with a particular sensor/PMU measurement (e.g., column 508 may be a second current magnitude from the first PMU, column 504 may be the first current magnitude measurements from the first PMU, and column 518 may be the second voltage angles from the third PMU). The hierarchical computing system 104 may use a total variation (TV) algorithm with a TV variable and/or a TV regularization parameter to determine the expected PMU measurements. In some instances, the hierarchical computing system 104 may generate a column vector by stacking rows of the PMU dataset (e.g., PMU dataset 600). Afterwards, the hierarchical computing system 104 may apply the optimization algorithm to the column vector to determine the expected PMU measurements. In some examples, the hierarchical computing system 104 may use another optimization algorithm such as a Nuclear Norm Minimization or Optimization Algorithm with the TV algorithm to determine the expected PMU measurements.

Equation (1) (Eq. (1)) below will be used to describe one example of the optimization algorithm (e.g., minimization algorithm) in more detail.

$$\text{minimize} \|X\|_* + \lambda \|col(X^T)\|_{TV} \text{ subject to } X_{ij} = M_{ij}, (i,j) \in \Omega, \qquad \text{Eq. (1)}$$

As shown, X represents a PMU dataset that includes the first PMU measurements and the predictive entries, $\|X\|_*$ represents a Nuclear Norm Minimization algorithm of the PMU dataset, $\lambda$ is a regularization parameter that is used to scale the TV norm, $col(X^T)$ represents the column stacking vector for the PMU dataset that is transposed, and $\|col(X^T)\|_{TV}$ represents the TV norm algorithm. Further, i represents the row and j represents the column of the dataset (e.g., data matrix), $X_{ij}$ represents all of the elements of the data matrix/dataset that includes the first PMU measurements and the predictive measurements, $M_{ij}$ represents the first PMU measurements within the data matrix/dataset, and $\Omega$ represents a random subset of cardinality m number of observations. In other words, in the optimization problem provided by Eq. (1), the goal is to determine values for the predictive entries (e.g., X1 to X90) such that the entire result is minimized. Based on these measurements being sufficient (e.g., above a threshold) and in the proper positions, then the computing system 104 may determine a low rank matrix that includes those entries and is a solution of the optimization problem.

In some examples, the TV parameter, $\lambda$, may be large enough such that the values from the TV algorithm are weighted significantly more than the Nuclear Norm Minimization algorithm. In such examples, the hierarchical computing system 104 may just use the TV algorithm for determining the expected PMU measurements (e.g., the Nuclear Norm Minimization algorithm is not used).

The TV algorithm may be a first order or a second order formulation. Equations (2) and (3) below will be used to show and describe the first and second order algorithms.

$$\|x\|TV1 \triangleq \sum_{i=1}^{n-1} |x_{i+1} - x_i| = \sum_{i=1}^{n-1} |\Delta x_i| = \|\Delta x\|_1, \quad \text{Eq. (2)}$$

$$\|x\|TV2 \triangleq \sum_{i=2}^{n-1} |x_{i+1} - 2x_i + x_{i-1}| = \sum_{i=2}^{n-1} |\Delta^2 x_i| = \|\Delta^2 x\|_1 \quad \text{Eq. (3)}$$

Eq. (2) shows a first order formulation of the TV algorithm and Eq. (3) shows a second order formulation of the TV algorithm. For instance, referring to Eq. (2) and Eq. (3), these equations are summation equations (e.g., TV norm definitions) where x is a signal vector (time series) with its i-th entry (i represents a time index) that is given by $x_i$. Eq. (2) shows the subtraction (e.g., a difference) of two adjacent values to capture the first order discrete total variation in the signal. Eq. (3) is similar to Eq. (2), but shows the second order total variation.

In other words, referring to FIGS. 5 and 6B, the hierarchical computing system 104 may use the first or second order formulations to determine the expected PMU measurements for a future time period. For instance, to determine the expected PMU measurements, the hierarchical computing system 104 may use a summation equation that includes differences between each entry with their previous entry in their column. Referring to column 502, the hierarchical computing system 104 may use a summation of each entry subtracted by its previous entry such as a summation of the absolute values for 331.7934-331.5096, 331.5096-331.5121, 331.5121-331.8519, 331.8519-X1, X1-X11, X11-X21, X21-X31, and so on. The summation equation may include multiple different columns (e.g., the summation equation may include the first PMU measurements and variables for column 502 that is shown above, the first PMU measurements and variables for column 504, the first PMU measurements and variables for column 506, and so on).

Therefore, using the column stacking vector, the hierarchical computing system 104 may determine a single equation that includes the first PMU measurements (e.g., the entire set of measurements or a portion of the measurements) and a plurality of variables (e.g., X1 to X90). Then, referring back to Eq. (1), this equation may be multiplied by the TV parameter (λ) and/or combined with the Nuclear Norm Minimization algorithm. Afterwards, the hierarchical computing system 104 may use an optimization algorithm (e.g., a MATLAB minimization algorithm and/or another optimization algorithm) so as to minimize the equation to determine the expected PMU measurements (e.g., values for the variables/predictive entries). The hierarchical computing system 104 may use any type of optimization (e.g., convex optimization) algorithm and/or other algorithms to determine the variables X1-X90.

While the first order formulation of the TV algorithm is described above, the hierarchical computing system 104 may use Eq. (3) or a second order formulation of the problem to determine the variables for the missing entries.

Referring back to FIG. 4, at block 406, the hierarchical computing system 104 receives a plurality of second PMU measurements the plurality of PMUs (e.g., PMUs 102 and/or 312). The plurality of second PMU measurements are associated with the future time period. For example, as mentioned previously, the future time period may be any time period that is after the time period for the first PMU measurements such as an immediately subsequent time period (e.g., the time period indicated by rows 542 to 558 of FIGS. 6A and 6B). FIG. 7 will describe this in more detail.

FIG. 7 depicts another exemplary PMU dataset of sensor measurements with obtained PMU measurements according to one or more examples of the present disclosure. In particular, FIG. 7 shows actual obtained PMU measurements from the PMUs for the future time period associated with rows 542 to 558.

At block 408, the hierarchical computing system 104 determines whether the power system is encountering a malicious attack based on comparing the plurality of expected PMU measurements with the plurality of second PMU measurements. For instance, PMU measurements are expected to be highly correlated in time because the power system is unlikely to have dramatic changes in such a short time period under normal operating conditions. As such, the hierarchical computing system 104 may expect that the first PMU measurements from the PMUs to not change much during the future time period. Therefore, the hierarchical computing system 104 may calculate or determine expected PMU measurements for this future time period. Then, after actually obtaining the PMU measurements for this future time period (e.g., the second PMU measurements), the hierarchical computing system 104 compares the obtained PMU measurements with the expected PMU measurements. Based on the obtained PMU measurements being significantly different enough from the expected PMU measurements, the hierarchical computing system 104 may determine the power system is encountering a malicious attack such as false data injection attack. In other words, if the actual obtained PMU measurements are statistically different enough (e.g., statistically significant) from the expected PMU measurements, then the hierarchical computing system 104 may determine that a malicious entity has injected false PMU data into the power system and/or performed another type of malicious attack on the power system. If the actual obtained PMU measurements are not statistically different enough from the expected PMU measurements, then the hierarchical computing system 104 may determine that the power system is not encountering a malicious attack.

In some instances, the hierarchical computing system 104 may use one or more thresholds to determine whether the power system is encountering a malicious attack. For example, the hierarchical computing system 104 may compare (e.g., determine differences for) each expected PMU measurement with its associated actual obtained PMU measurement. For instance, the hierarchical computing system 104 may determine differences between the variables X1 through X90 (shown in FIG. 6B) and their counterpart actual obtained PMU measurements from the PMUs (shown in FIG. 7). The hierarchical computing system 104 may aggregate the differences between the expected PMU measurements and the obtained PMU measurements and then compare the aggregate value with a threshold. Based on the aggregate value exceeding the threshold, the hierarchical computing system 104 may determine the power system is encountering a malicious attack.

In some examples, the hierarchical computing system 104 determines the plurality of expected PMU measurements (e.g., PMU predictions) by solving the TV norm minimization. Then, the hierarchical computing system 104 may wait until it receives the actual PMU values and then use a threshold test to determine whether to raise an anomaly flag in the PMU measurements. This is shown and described in Eq. (5) below. For instance, the hierarchical computing system 104 may compare the relative recovery error with a determined given threshold to detect the presence of an anomaly. Additionally, and/or alternatively, in order to determine if there is a real and meaningful difference in the actual data (e.g., actual PMU measurements) versus the predicted data (e.g., expected PMU measurements), the hierarchical computing system 104 may employ a test of statistical significant such as a t-test or a chi-squared test (e.g., the hierarchical computing system 104 uses a statistical significant test such as a t-test and/or a chi-squared test to determine whether the power system is encountering a malicious attack).

At block 412, the hierarchical computing system 104 executes an action based on whether the power system is encountering the malicious attack. For example, the hierarchical computing system 104 may include a display device and may display a prompt indicating whether the power system is encountering a malicious attack. Additionally, and/or alternatively, the hierarchical computing system 104 may provide information indicating the malicious attack to another entity (e.g., the power generation system 302).

In some instances or implementations, aggregating devices within the hierarchical computing system 104 upon detecting malicious attack within a threshold of confidence may disable the network or device interface of the gateway device dedicated to the affected device to provide isolation. This interface may be part of the constituent device within the hierarchical computing system 104 (a gateway device with multiple physical Ethernet or serial-based connectors or part of a wireless interface) or separate within a network switch, router, or gateway separately operated. The gateway device may identify and blacklist a particular media access control (MAC) address associated with the affected device (e.g., the affected PMU) until a technician addresses the issue. Connection to an external network switch, router, or gateway for blacklisting a device (e.g., PMU) determined to have be affected by malicious attack may require additional out-of-band access to the router or reporting to a device within the hierarchical computing system 104 at a higher hierarchical level. Depending on severity of the incident, alerting of technicians or automated action may trigger a switch to separate backup devices previously in place.

In other words, upon detecting a malicious attack, the hierarchical computing system 104 may isolate PMUs that have been attacked. For instance, the hierarchical computing system 104 may block the transmission of the data locally until the hierarchical computing system 104 receives an "all clear" signal that the attack is over. Additionally, and/or alternatively, the environment 100 may include one or more back-up devices (e.g., PMU devices) that are instrumented to the same location and may be switched if maintenance or compromise is determined (e.g., a malicious attack on the PMU is determined). Additionally, and/or alternatively, a device that is higher up in the hierarchical computing system 104 may block the physical and/or wireless interface of a device within the environment 100 (e.g., a PMU and/or a computing device of the hierarchical computing system 104). Additionally, and/or alternatively, the hierarchical computing system 104 may issue a command to a network switch or router to disconnect the devices (e.g., the PMUs) impacted by the malicious attack. Additionally, and/or alternatively, the hierarchical computing system 104 may issue a command to switch to a back-up device (e.g., a back-up device to the PMU).

In some variations, the hierarchical computing system 104 may use previous PMU datasets associated with previous PMU measurements to determine whether to use the first and/or second order formulations (e.g., Eq. (2) or Eq. (3)) and/or to determine the TV parameter ($\lambda$) for determining the expected PMU measurements. For example, the hierarchical computing system 104 may use a relative recovery error measurement, which is shown in Eq. (4) below, to determine whether to use the first and/or second order formulations and/or to determine the TV parameter ($\lambda$).

$$\text{Relative Recovery Error} = \frac{\|M - X\|_F}{\|M\|_F}, \quad \text{Eq. (4)}$$

As shown, M represents the actual PMU matrix/PMU dataset and X represents a recovered matrix/PMU dataset. In other words, the hierarchical computing system 104 may receive a complete set of PMU measurements from a plurality of PMUs, which may be represented by M. Then, the hierarchical computing system 104 may remove certain selections of PMU measurements from the PMU dataset. The hierarchical computing system 104 may use different values for the TV parameter and/or the first or second order formulations to determine the missing entries. The hierarchical computing system 104 may generate the matrix X by inserting the missing entries into the selections of PMU measurements that have been removed from the PMU dataset. After, the hierarchical computing system 104 may use Eq. (4) to determine the relative recovery error. The hierarchical computing system 104 may continuously apply different TV parameters/first or second order formulation to determine the best relative recovery error. Subsequently, the hierarchical computing system 104 may use the determined optimal TV parameter/first or second order formulation in process 400 above to determine the expected PMU measurements.

To put it another way, each power grid or power system may be different. For instance, certain power systems may have more PMUs or PMUs that are spread out across a greater distance. Further, the environmental factors for the power system may be different (e.g., a power grid in a northern state may be different from a power grid from a southern state). Accordingly, the hierarchical computing system 104 may use a TV parameter and/or a first/second order formulation to account for the differences between different power grids/systems. For instance, the hierarchical computing system 104 may obtain a PMU dataset and use the PMU dataset to determine the optimal TV parameter to use for determining the expected PMU measurements. The hierarchical computing system 104 may then use the TV parameter to determine the expected PMU measurements. As mentioned previously, in some examples, the TV parameter may be significantly large enough such that the hierarchical computing system 104 may only use the TV algorithm to determine the expected PMU measurements.

In other words, PMU matrix data is not only low-rank but its entries vary slowly therefore, the signals may be approximated by a piecewise constant function (each row of PMU matrix data is related to measure a physical property at different time stamps. The nuclear norm optimization problem may be augmented by a second term, e.g., TV regularization term to promote this property. Two different discrete total variation terms, namely first and second order, are described herein. In the first order, the variation is calculated based on the difference between two consecutive values (such as forward or backward difference in approximating derivative at some point); however, in the second order, a centered difference technique is used to approximate the gradient of the signal based on three consecutive values of data. In order to promote the sparsity, the "L1" norm of these variations is taken and introduced the total variation term, which was added to the original nuclear norm minimization problem.

In some variations, the plurality of first PMU measurements may be missing certain entries. For instance, due to network connectivity issues and/or other reasons, PMUs might not be able to take certain measurements (e.g., the PMUs may lose power temporary and therefore cannot take measurements during their power loss) and/or the hierarchical computing system 104 might not receive these measurements even if they are taken (e.g., due to network connectivity issues, the measurements might be lost during transmission to the computing system). Accordingly, the hierarchical computing system 104 may use the TV norm algorithm and/or the Nuclear Norm Minimization to determine the missing entries. For instance, after receiving the plurality of first PMU measurements at block 402 and prior to determining the plurality of expected PMU measurements at block 404, the hierarchical computing system 104 may determine that the plurality of first PMU measurements include missing entries (e.g., an absence of the hierarchical computing system 104 receiving a PMU measurement such as a sensor reading such as a phase of the current or magnitude of the current at a particular time). The hierarchical computing system 104 may determine and use one or more substitute entries for the missing entries based on an optimization algorithm (e.g., a TV norm definition) such as a Nuclear Norm Minimization or Optimization Algorithm with the TV algorithm to determine the substitute entries. In other words, the hierarchical computing system 104 may use Eq. (1) above to determine the substitute entries. Then, the hierarchical computing system may insert the substitute entries into the plurality of first PMU measurements to determine a complete set of the plurality of first PMU measurements. After obtaining the complete set of the plurality of first PMU measurements, the hierarchical computing system 104 may use Eq. (1) again to determine the expected PMU measurements at block 404. Using an optimization algorithm to determine the substitute entries is described in U.S. patent application Ser. No. 17/382,578, filed on Jul. 22, 2021, titled "SYSTEMS AND METHODS FOR OPTIMAL SYNCHROPHASOR DATA RECOVERY", which is incorporated by reference in its entirety herein.

As described previously, the order of complexity of recovering a low-rank matrix is equal to its degrees of freedom. Thus, solving Hankel nuclear norm minimization problem can be determined to take much more time than nuclear norm minimization problem due to the difference in their degrees of freedom. Several data recovery scenarios are performed to compare the system and method of the present disclosure with nuclear norm and Hankel norm minimization problem for both randomized and temporally missing data recovery.

False data injection (FDI) attacks may be created to be unobservable to the residual based bad data detection (BDD). However, given the high sampling rate of PMUs, the PMU measurements may be expected to be highly correlated in time, because the power system is unlikely to have dramatic changes in such short time period under normal operating conditions. Therefore, a detector that takes into consideration the temporal correlations of the PMU measurements may be able to detect such "unobservable" FDI attacks. A predictive filter that accurately predicts the PMU measurements may be used for this. This filter flags anomalies based on the difference between measured value and predicted value being larger than a threshold, which is often the case when an FDI attack is launched.

The present disclosure investigates the following problem: Given phasor measurement unit data, how can abnormal behavior be detected which might be a sign of malicious attack on the grid?

A smart grid improves the efficiency of power grids via the aid of modern communication, signal processing, and control technologies. While smart grid integration enables power grid networks to be smarter, it also increases the risk of cyberattacks due to the strong dependence on the cyber-infrastructure in the overall system.

State estimation is a critical component of power system monitoring. System state is estimated based on the obtained measurements across the system. Bad data can affect the state estimation and mislead the system operator. Conventional bad data detection techniques are typically based on gross errors appearing in the measurement residuals which can be detected using statistical analysis such as the Chi square test. While relatively effective against random noises, these detectors lack the ability to detect highly structured bad data that conforms to the network topology and some particular physical laws. Therefore, false data injection (FDI) attacks can be created to be unobservable to the residual based bad data detection (BDD). However, given the high sampling rate of PMUs, one would expect the PMU measurements to be highly correlated in time, because the power system is unlikely to have dramatic changes in such short time period under normal operating conditions. Therefore, a detector that takes into consideration the temporal correlations of the PMU measurements may be able to detect such "unobservable" FDI attacks. One way to do this is to have a predictive filter that accurately predicts the PMU measurements. This filter flags anomaly if the difference between measured value and predicted value is larger than a threshold, which is often the case when an FDI attack is launched. The research on the detection of unobservable attacks is still limited.

The present disclosure describes how to solve the problem of developing an efficient method at the edge to predict PMU measurements ahead of time and compare it with the actual measurements to make sure data integrity by detecting any anomaly presence in the data.

Since many practical PMU datasets have intrinsic low-dimensional structures, the missing data recovery problem can be formulated as a low-rank matrix completion problem. Given an n×n matrix with rank r (r<<n), as long as order of its degrees of freedom entries are observed, all the remaining entries can be accurately recovered by solving a convex nuclear norm minimization. The low-rank matrix model, however, does not capture the temporal correlations in time series therefore, it is not suitable for temporally missing data recovery problem.

There are many applications where the model of interest is known to have several structures at the same time. A signal that lies in the intersection of several sets defining the individual structures is sought. An example of a simultaneously structured model is a matrix that is simultaneously low-rank and slowly varying (e.g., the signal of interest is low-rank and its entries vary slowly, i.e., the signal can be approximated by a piecewise constant function). To encourage low-rank, the nuclear norm can be used. To promote the piecewise constant structure, first or second order discrete total variation can be used by adding as a regularization term into original nuclear norm minimization problem.

Then, the future set of measurements may be predicted and the results may be compared with the actual data to find any anomaly in the data that could be a sign of either false data injection attack or simply changing in the behavior of grid due to the load changes.

Figure 8:
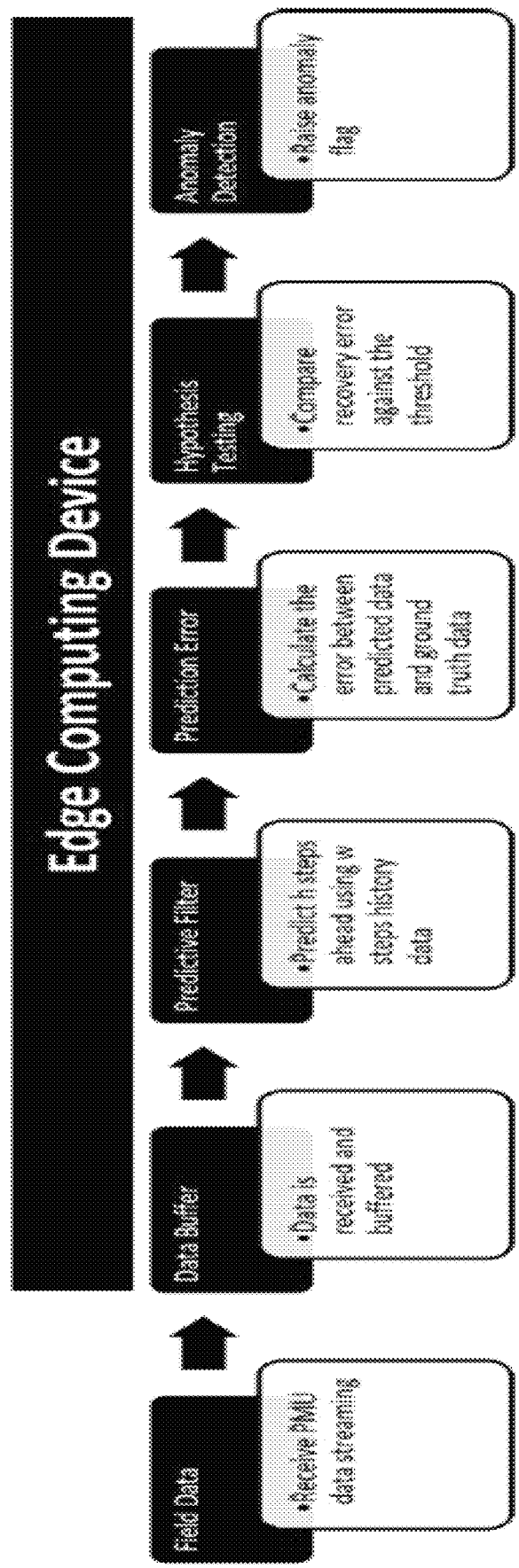
FIG. 8 illustrates another simplified block diagram depicting false data injection and anomaly detection architecture according to one or more examples of the present disclosure.

A block diagram of false data injection and anomaly detection in PMU data is shown in FIG. 8. In other words, FIG. 8 illustrates another simplified block diagram depicting false data injection and anomaly detection architecture according to one or more examples of the present disclosure. In operation, the first stage includes a communications radio to poll and receive smart meter streaming data as well as a local buffer at the edge device to store smart meter streaming data. The size of the buffer may be larger than the size of the batch of data, which is usually a week or month of data. Since the size of the buffer is fixed, the old data may be overwritten by the new one. This data may be received by directly communicating with advanced metering infrastructure (AMI) meters (e.g. through a sub-900 MHz radio), inferred measurements from another smart device such as a smart re-closer or transformer, or direct integration of the smart meter with an edge or cloud storage platform using secondary protocols such as Advanced Message Queuing Protocol (AMQP), Message Queuing Telemetry Transport (MQTT), or Data Distribution Service (DDS). In the second stage, a batch of "w" steps history data from the buffer is read and used to predict a plurality of steps ahead set of measurement. When the real measurement arrives, it compares to the predicted values to calculate the prediction error which later compares against a threshold to raise anomaly flag.

In other words, the prediction problem can be stated as: Predict h≥1 steps ahead of set measurement i.e., $m_{t+1}$ up to $m_{t+h}$ using w steps history measured data, i.e., $m_{t-w+1}$ up to $m_t$, where h are the steps ahead, m is the set of measurements, t is the time, and w is the steps history of measured data. The problem may be solved using the optimization problem described above in Eq. (1).

Data which are corrupted by adversary attacks, topological errors, or faulty sensors, can be detect by calculating the Relative Recovery Error at time t+h where the actual values are received, and using a threshold test to raise the anomaly flag in the PMU measurements as $$\text{Relative Recovery Error} = \frac{\|M - X\|_F}{\|M\|_F} \underset{H_0}{\overset{H_1}{\gtrless}} \gamma, \quad \text{Eq. (5)}$$

where hypotheses without and with FDI are shown by $H_0$ and $H_1$, respectively. Moreover, X is the solution to the optimization problem and γ stands for optimal decision threshold which is predetermined by solving the following optimization problem $$\text{maximize TPR}(\gamma) \text{ subject to FPR}(\gamma) = \alpha, \quad \text{Eq. (6)}$$

where TPR and FPR stands for true positive rate and false positive rate respectively and α is a significance level (false alarm probability).

One way to solve Eq. (6) is the Monte Carlo simulation: Conduct N independent experiment for every value of γ, calculate true positive rate and false positive rate using confusion matrix notion as $$TPR(\gamma) = \text{Sensitivity }(\gamma) = \frac{TP(\gamma)}{TP(\gamma) + FN(\gamma)}, \quad \text{Eq. (7)}$$

$$FPR(\gamma) = 1 - \text{Specificity }(\gamma) = \frac{FP(\gamma)}{FP(\gamma) + TN(\gamma)},$$

where TP, TN, FP, and FN stands for true positive, true negative, false positive, and false negative respectively over N independent run. Then, pick γ that satisfies Eq. (6).

The other way to detect a change in the PMU data matrix is to compare the predicted columns of data with the measured ones to form the error $$e_k = m_k - \hat{m}_k \forall k \in [t+1, t+h]. \quad \text{Eq. (8).}$$

The series e(·) is white noise if the PMU data matrix does not change. This can be verified by the turning point test. When the prediction error $\|e_k\|$ exceeds a predefined threshold, the PMU data matrix has changed at time k.

Since this is a data driven technique, a-priori information about the Jacobian matrix (system structure or topological information) or any assumption that the background noise in state estimation are white Gaussian noise (WGN) might not be needed. It is also the same for both DC (linear regression problem) and AC (nonlinear regression problem) power flow models. Adding the total variation norm term to the optimization problem, makes it prune not only to the sudden attacks where PMU measurements change suddenly but also to the ramping attacks where the PMU measurements change gradually.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for determining whether a power system is encountering a malicious attack, comprising:
   receiving a plurality of first phasor measurement unit (PMU) measurements from a plurality of PMUs of the power system, wherein each of the plurality of first PMU measurements is associated with a time stamp and a sensor reading corresponding to an electrical characteristic;

determining a plurality of expected PMU measurements associated with a future time period based on an optimization algorithm that uses differences between a plurality of consecutive predictive entries and the plurality of first PMU measurements, wherein a first predictive entry, of the plurality of consecutive predictive entries, is immediately subsequent to the plurality of first PMU measurements, wherein determining the plurality of expected PMU measurements associated with the future time period comprises:

assigning a plurality of variables for a plurality of entries associated with the future time period, wherein the plurality of variables are the plurality of consecutive predictive entries;

determining a total variation (TV) norm definition based on the plurality of variables and the plurality of first PMU measurements; and inputting the TV norm definition into the optimization algorithm to determine the plurality of expected PMU measurements;

receiving, from the plurality of PMUs, a plurality of second PMU measurements associated with the future time period;

determining whether the power system is encountering the malicious attack based on comparing the plurality of expected PMU measurements with the plurality of second PMU measurements; and executing an action based on whether the power system is encountering the malicious attack, wherein executing the action comprises triggering a switch to disable a network or device interface of a gateway device associated with an affected PMU, from the plurality of PMUs of the power system, to provide isolation to the affected PMU.

2. The method of claim 1, wherein each of the plurality of PMUs is located at a different location within the power system and configured to obtain a plurality of sensor readings corresponding to a plurality of electrical characteristics at the location, and
wherein the plurality of electrical characteristics comprise a magnitude of a current, a phase angle of the current, a magnitude of a voltage, and a phase angle of the voltage.

3. The method of claim 1, wherein determining the TV norm definition is based on using a column stacking vector and a TV algorithm.

4. The method of claim 3, wherein the TV algorithm is a first order equation that is a summation of:
differences between consecutive variables within the plurality of variables;
differences between consecutive values within the plurality of first PMU measurements; and
differences between a variable, from the plurality of variables, and a PMU measurement, from the plurality of first PMU measurements, that are sequential in time.

5. The method of claim 3, wherein the TV algorithm is a second order equation.

6. The method of claim 3, wherein determining the TV norm definition is further based on using a nuclear norm minimization algorithm and a TV parameter that is a weighted value for the TV algorithm to distinguish the TV algorithm from the nuclear norm minimization algorithm.

7. The method of claim 6, further comprising:
using a plurality of historical PMU measurements from the plurality of PMUs within the power system to determine a plurality of TV parameters; and
determining the TV parameter from the plurality of TV parameters based on a relative recovery error associated with the plurality of historical PMU measurements.

8. The method of claim 1, further comprising:
determining that the plurality of first PMU measurements comprises one or more missing entries; and
determining one or more substitute entries for the one or more missing entries,
wherein determining the plurality of expected PMU measurements is further based on using the one or more substitute entries.

9. A power system, comprising:
a plurality of phase measurement units (PMUs) configured to obtain a plurality of first PMU measurements; and
a hierarchical computing system comprising:
one or more first computing systems configured to:
receive the plurality of first PMU measurements from the plurality of PMUs, wherein each of the plurality of first PMU measurements is associated with a time stamp and a sensor reading corresponding to an electrical characteristic; and
provide the plurality of first PMU measurements to one or more second computing systems; and
the one or more second computing systems configured to:
determine a plurality of expected PMU measurements associated with a future time period based on an optimization algorithm that uses differences between a plurality of consecutive predictive entries and the plurality of first PMU measurements, wherein a first predictive entry, of the plurality of consecutive predictive entries, is immediately subsequent to the plurality of first PMU measurements, wherein determining the plurality of expected PMU measurements associated with the future time period comprises:
assigning a plurality of variables for a plurality of entries associated with the future time period, wherein the plurality of variables are the plurality of consecutive predictive entries;
determining a total variation (TV) norm definition based on the plurality of variables and the plurality of first PMU measurements; and
inputting the TV norm definition into the optimization algorithm to determine the plurality of expected PMU measurements;
receive, from the plurality of PMUs, a plurality of second PMU measurements associated with the future time period;
determine whether the power system is encountering a malicious attack based on comparing the plurality of expected PMU measurements with the plurality of second PMU measurements; and
execute an action based on whether the power system is encountering the malicious attack, wherein executing the action comprises triggering a switch to disable a network or device interface of a gateway device associated with an affected PMU, from the plurality of PMUs of the power system, to provide isolation to the affected PMU.

10. The power system of claim 9, wherein each of the plurality of PMUs is located at a different location within the power system and configured to obtain a plurality of sensor readings corresponding to a plurality of electrical characteristics at the location, and
  wherein the plurality of electrical characteristics comprise a magnitude of a current, a phase angle of the current, a magnitude of a voltage, and a phase angle of the voltage.

11. The power system of claim 9, wherein determining the TV norm definition is based on using a column stacking vector and a TV algorithm.

12. The power system of claim 11, wherein the TV algorithm is a first order equation that is a summation of:
  differences between consecutive variables within the plurality of variables;
  differences between consecutive values within the plurality of first PMU measurements; and
  differences between a variable, from the plurality of variables, and a PMU measurement, from the plurality of first PMU measurements, that are sequential in time.

13. The power system of claim 11, wherein the TV algorithm is a second order equation.

14. The power system of claim 11, wherein determining the TV norm definition is further based on using a nuclear norm minimization algorithm and a TV parameter that is a weighted value for the TV algorithm to distinguish the TV algorithm from the nuclear norm minimization algorithm.

15. The power system of claim 14, wherein the one or more second computing systems are further configured to:
  use a plurality of historical PMU measurements from the plurality of PMUs within the power system to determine a plurality of TV parameters; and
  determine the TV parameter from the plurality of TV parameters based on a relative recovery error associated with the plurality of historical PMU measurements.

16. The power system of claim 9, wherein the one or more second computing systems are further configured to:
  determine that the plurality of first PMU measurements comprises one or more missing entries; and
  determine one or more substitute entries for the one or more missing entries,
  wherein determining the plurality of expected PMU measurements is further based on using the one or more substitute entries.

17. A non-transitory computer-readable medium having processor-executable instructions stored thereon, wherein the processor-executable instructions, when executed by one or more controllers, facilitate:
  receiving a plurality of first phasor measurement unit (PMU) measurements from a plurality of PMUs of the power system, wherein each of the plurality of first PMU measurements is associated with a time stamp and a sensor reading corresponding to an electrical characteristic;
  determining a plurality of expected PMU measurements associated with a future time period based on an optimization algorithm that uses differences between a plurality of consecutive predictive entries and the plurality of first PMU measurements, wherein a first predictive entry, of the plurality of consecutive predictive entries, is immediately subsequent to the plurality of first PMU measurements, wherein determining the plurality of expected PMU measurements associated with the future time period comprises:
    assigning a plurality of variables for a plurality of entries associated with the future time period, wherein the plurality of variables are the plurality of consecutive predictive entries;
    determining a total variation (TV) norm definition based on the plurality of variables and the plurality of first PMU measurements; and
  inputting the TV norm definition into the optimization algorithm to determine the plurality of expected PMU measurements;
  receiving, from the plurality of PMUs, a plurality of second PMU measurements associated with the future time period;
  determining whether the power system is encountering a malicious attack based on comparing the plurality of expected PMU measurements with the plurality of second PMU measurements; and
  executing an action based on whether the power system is encountering the malicious attack, wherein executing the action comprises triggering a switch to disable a network or device interface of a gateway device associated with an affected PMU, from the plurality of PMUs of the power system, to provide isolation to the affected PMU.

18. The non-transitory computer-readable medium of claim 17, wherein each of the plurality of PMUs is located at a different location within the power system and configured to obtain a plurality of sensor readings corresponding to a plurality of electrical characteristics at the location, and
  wherein the plurality of electrical characteristics comprise a magnitude of a current, a phase angle of the current, a magnitude of a voltage, and a phase angle of the voltage.

* * * * *